Patented Feb. 6, 1951

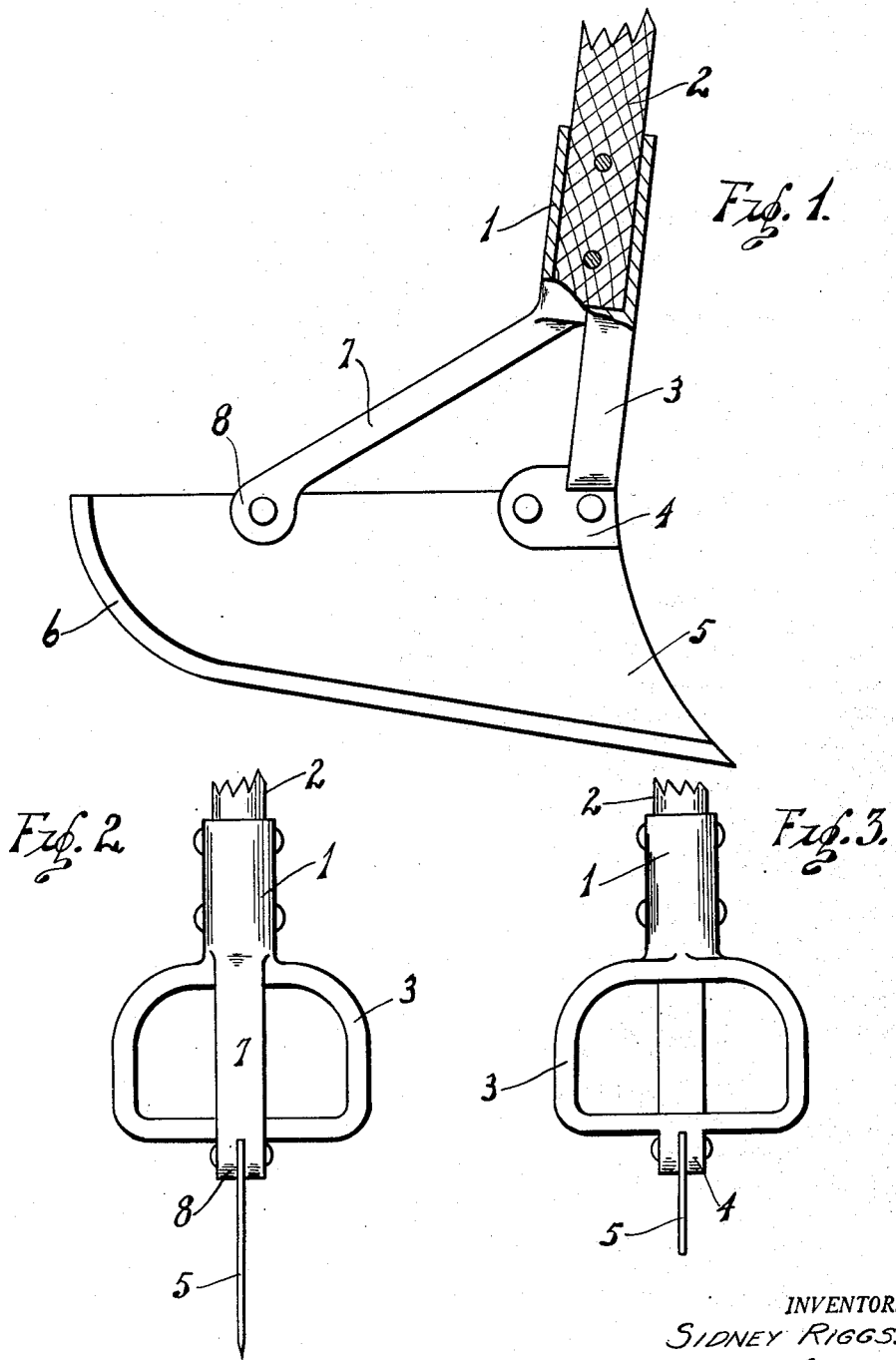

2,540,597

UNITED STATES PATENT OFFICE 2,540,597

BLADE TYPE GRASS EDGER

Sidney Riggs, Long Beach, Calif.

Application December 1, 1947, Serial No. 789,006

1 Claim. (Cl. 30—315)

This invention relates to a blade type grass edger whereby a lawn may be edged by pressing the blade through the grass and then rocking the blade forwardly to cut a space equal to the length of the blade.

An object of my invention is to provide a novel blade type grass edger consisting of a sharp blade which is pressed into the ground by stepping into a stirrup at the rear edge of the blade.

Another object of my invention is to provide a novel grass edger of the character stated in which the rear edge of the blade is forced into the ground, and the blade is then rocked forwardly by movement of the handle, thus cutting a space equal to the length of the blade.

Still another object is to provide a novel grass edger of the character stated which is simple in construction, inexpensive to manufacture, and effective in operation.

Other objects, advantages and features of invention may appear from the accompanying drawing, the subjoined detailed description and the appended claim.

In the drawing—

Figure 1 is a side elevation of my grass edger with parts broken away to show interior construction.

Figure 2 is a front view of the edger.

Figure 3 is a rear view of the same.

Referring more particularly to the drawing, the numeral 1 indicates a socket into which a handle 2 extends. This handle is fixedly secured in the socket 1 by suitable means, such as rivets, or bolts. A stirrup 3 extends downwardly from the socket 1 and is integrally formed with the socket. A bifurcated ear 4 projects downwardly from the stirrup 3 at the bottom of the stirrup, and the blade 5 is fixedly secured in this ear.

The blade is primarily formed as a thin sheet of plate material, and the bottom cutting edge of the blade preferably slopes upwardly towards the forward curved edge 6. A brace arm 7 extends downwardly from the socket 1 and is integrally formed with this socket. The lower part of the brace arm 7 is bifurcated as shown at 8, and fits over the blade and is fixedly attached to the blade by means of a rivet, bolt, or other suitable attaching device.

In operation the user steps into the stirrup 3, forcing the rear edge of the blade 5 into the ground. The handle 2 is then pushed forwardly rocking the blade forwardly into the ground, thus cutting a swath in the grass. The blade is then pulled out of the ground and moved forwardly, and the operation is repeated.

Having described my invention, I claim:

A blade type grass edger comprising a socket, a handle fixedly mounted in said socket and projecting therefrom, a stirrup depending vertically from said socket and integrally formed therewith, said stirrup being positioned immediately below the socket, an ear on the lower end of the stirrup, a blade fixedly attached to said ear, a brace arm integrally formed with the socket and extending downwardly therefrom at an angle, said brace arm being fixedly attached to said blade at the top of the blade.

SIDNEY RIGGS.

REFERENCES CITED

The following references are of record in the file of this patent:

UNITED STATES PATENTS

| Number | Name | Date |
|---|---|---|
| 351,196 | McMillen | Oct. 19, 1886 |
| 463,806 | Biro | Nov. 24, 1891 |
| 1,043,729 | Rolfson | Nov. 5, 1912 |
| 1,931,349 | Habig | Oct. 17, 1933 |
| 1,964,366 | Schwarz | June 26, 1934 |
| 2,503,757 | Morgan | Apr. 11, 1950 |